INVENTORS
RICHARD J. ANNESSER
ALAN G. BRIDGE
JOHN F. SENGER
JOHN W. SCOTT, JR.

BY
ATTORNEYS

United States Patent Office 3,573,201
Patented Mar. 30, 1971

3,573,201
IRON REMOVAL USING A HIGH ASPECT RATIO
BED OF CONTACT PARTICLES
Richard J. Annesser, Berkeley, John W. Scott, Jr., Ross, John F. Senger, Berkeley, and Alan G. Bridge, El Cerrito, Calif., assignors to Chevron Research Company, San Francisco, Calif.
Filed Oct. 10, 1968, Ser. No. 766,604
Int. Cl. C10g 23/02, 23/16
U.S. Cl. 208—251        9 Claims

ABSTRACT OF THE DISCLOSURE

Iron is removed from a hydrocarbon feed containing iron as soluble organometallic compounds by passing the hydrocarbon feed together with hydrogen at elevated temperature and pressure through a bed of contact particles, the bed being shaped so as to have a ratio of cross-sectional flow area to bed volume of at least 0.20. Preferably, the bed is an annulus of contact particles through which the hydrocarbon feed flows radially inward, or a bed of contact particles disposed in a horizontal cylindrical vessel. Preferably a major portion of the liquid effluent from the bed is recycled to the bed; and, particularly for radial flow operation, preferably the hydrogen is dissolved in the hydrocarbon feed.

BACKGROUND OF THE INVENTION

Field of the invention

This invention relates to the removal of metal compounds from petroleum crude oils, heavy oils derived from other hydrocarbonaceous matter and various hydrocarbon fractions derived from crude oils and other hydrocarbonaceous matter. More specifically, this invention is directed to a hydrogenation process for removal of iron compounds present as soluble organometallic compounds in various heavy oils, such as atmospheric tower bottoms products, vacuum tower bottoms products, solvent deasphalted oils, heavy cycle oils, oils from tar sands, etc.

Prior art

Petroleum crude oil, and the other hydrocarbon fractions mentioned above, often contain organometallic contaminants which cause deleterious effects in various catalytic processes to which the heavy hydrocarbon fraction may be subjected. The more common of the metallic contaminants are iron, vanadium, and nickel, often existing in concentrations in excess of 50 p.p.m. Other metals, including sodium, copper, etc., may also be present. These metals may exist within the hydrocarbon distillate and residuum fractions in a variety of forms; they may exist as metal oxides or as sulfides introduced therein as a form of metallic scale; they may be present in the form of soluble salts of such metals; usually, however, they are present in the form of high molecular weight organometallic compounds including metal prophyrins, metal naphthenates and the various derivatives of the prophyrins and naphthenates.

The forms which the soluble metallic compounds may assume in oils, particularly residual oils, are not known with certainty. One general form for a metallic prophyrin may be represented as follows for iron:

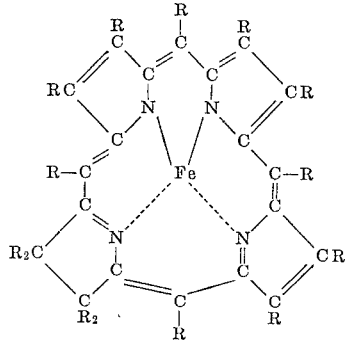

Another type of soluble organometallic compound found in oils is the metal naphthenate. One general form for the metal naphthenate may be represented as follows for iron:

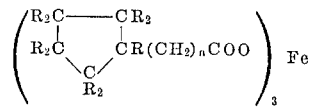

where $n$ may be zero but generally is an integer between 1 and 5, and R is hydrogen or an alkyl group.

Although metallic contaminants existing as oxide or sulfide scale may be removed at least in part by a relatively simple filtering technique and the water soluble salts are at least in part removable by washing and a subsequent dehydration procedure, a much more severe treatment is required to effect the destructive removal of the organometallic compounds, particularly to the degree which is necessary to produce a heavy hydrocarbon fraction suitable for further processing. Examples of further processing wherein it is desired to have a low metals content or essentially metal-free feed include hydrocracking, hydroisomerization, hydrotreating, catalytic cracking, etc.

The idea of catalytically hydrocracking high boiling hydrocarbon oils to obtain lower boiling, more valuable products is not new. Practical attainment of this objective, however, is another matter. High temperature, high pressure, destructive hydrogenation proposed years ago was too expensive ever to be used commercially on a wide scale when any other choice was available to the refiner. Recently new hydrocracking processes have been developed which convert hydrocarbon middle distillates and gas oils to gasoline; for example, the process of U.S. Patent 2,944,006 to J. W. Scott, Jr. This process is very economical because it achieves high yields of high grade products at moderate operating conditions of temperature and pressure. An acidic hydrocracking catalyst is used, and nitrogen compounds are removed from the feed. It is desired to extend this type of operation to the conversion of the heaviest and least valuable portions of the crude barrel; e.g., residuum. Serious problems of catalyst fouling or deactivation arise, however, when one attempts to hydrocrack very heavy or high boiling hydrocarbon oils.

In addition to serious deactivation problems in hydrocracking heavy oil feeds containing organometallic compounds, another problem arises which is frequently more serious than the catalyst deactivation problem. This is the problem of fixed bed plugging due to the deposition of metallic compounds, in many instances primarily iron metallic compounds, in the void or interstitial space between the catalyst particles in the catalyst bed.

It is known that when a heavy oil is passed through a bed of solid, porous contact particles at elevated temperature and hydrogen pressure, some of the metal compounds present in the residuum will form metalliferous deposits on and between the contact particles in the bed, whereas other metal compounds in the residuum form metalliferous deposits within the pores of the contact particles. It is found that the first-mentioned class of metal compounds, forming deposits on and between the particles, includes such metals as iron, sodium, calcium, and some of the vanadium compounds. The second-mentioned class of metal compounds, forming deposits within the pores, includes such metals as nickel and most of the vanadium compounds.

Metal compounds in the first-mentioned class generally tend to decompose to form deposits more readily under the influence of heat and hydrogen than metal compounds in the second-mentioned class, but there does not appear to be a sharp line of demarcation in this respect. After residuum has been passed through a bed of porous contact particles at elevated temperature and hydrogen pressure effective to decompose metal compounds in the residuum, metalliferous deposits of both types are found throughout the bed. The amount of each type of deposit is greatest near the inlet end of the bed, decreasing toward the outlet end of the bed with respect to the direction of oil flow. The deposits of the class including iron, sodium, and calcium present a special problem in that, because the deposits form on and between the particles, the bed may become clogged with deposits restricting oil flow therethrough, particularly at the inlet cross-sectional flow area of the bed. The deposits of nickel and vanadium which form within the pores of the particles could build up to substantial concentrations without restricting oil flow through the bed and, in many cases, without too adversely affecting catalytic activity in a situation where, for example, hydrogenation or hydrocracking catalyst particles are used as the porous contact particles in a fixed bed process.

To substantially reduce the metals in the feed to a hydrocracker, U.S. Patent 3,365,389 to B. G. Spars and R. H. Kozlowski discloses the use of a guard bed in a first reaction zone ahead of the hydrocracker reactor. According to U.S. Patent 3,365,389, the first reaction zone is maintained at a temperature of above about 820° F. and at a pressure between 1,000 and 5,000 p.s.i.g. The first reaction zone is basically comprised of a fixed bed of catalyst. According to the drawing, a fixed bed is disclosed as being placed in an upright cylindrical vessel with flow being through the bed parallel to the longitudinal axis of the cylinder. Because the porous contact particles eventually become heavily coated with a deposit of metal compounds and the guard bed thus tends to become plugged, another guard bed is provided in parallel. When one bed becomes plugged, the feed may be switched to the other bed. In some services, this type of arrangement is very advantageous; but it has the drawback of relatively high pressure drop through the guard bed after depositing metals only in the upper part of the bed.

SUMMARY OF THE INVENTION

According to the present invention, in a process for removing iron contaminants contained in a hydrocarbon feedstock as soluble organometallic compounds, wherein the hydrocarbon together with hydrogen-rich gas is passed through a bed of particles at an elevated temperature between 400 and 1,000° F. so that metals are deposited in the bed, the improvement is made which comprises disposing said particles in a bed configuration which has an aspect ratio of at least 0.20.

By "aspect ratio" is meant the ratio of cross-sectional flow area at the entrance of the bed of contact particles to the volume occupied by the bed of contact particles. The aspect ratio is a parameter useful for characterizing reactors of widely varying geometry and is of critical importance in the process of the present invention. While length divided by the diameter ($L/D$) is an excellent parameter for axial flow cylindrical reactors, it is not useful for other reactors, such as radial flow or horizontal reactors. Aspect ratio is particularly important in defining the present invention because a general term for area is used to characterize the geometry normal to the direction of flow. The diameter term in $L/D$ restricts its application to circular cross sections.

Dimensions for aspect ratio are $l^2/l^3$, wherein $l^2$ is directly proportional to the cross-sectional flow area at the entrance to the bed of particles, and $l^3$ is directly proportional to the volume of the bed of particles. The aspect ratio must be used while considering a fixed volume of catalyst. With this restriction, it may be used as a prime indicator of the pressure drop and contacting parameters of a wide variety of configurations of the mass of contact particles or catalyst used to remove iron from hydrocarbon feeds. Thus the aspect ratio is useful to reveal the very low pressure drops and more effective utilization of contact particles and/or catalyst that is possible wtih high aspect ratio configurations.

It has been found that poor liquid distribution is a problem with high aspect ratio, low pressure drop, mixed phase reactors. However, it has been determined that recycling a portion of the liquid effluent from the bed can increase the pressure drop in an acceptable manner and improve contacting efficiency. It is advantageous to recycle to the point of flooding the bed. Thus, in a process for removing iron from a hydrocarbon feed according to the present invention, preferably a portion of the liquid effluent from the bed of contact particles is recycled as feed to the bed. The advantages of recycling a portion of the liquid effluent are related to the reactor configuration, and recycling is particularly important when using high aspect ratio configurations for the mass of contact particles in the reactor.

The acceptable increase in pressure drop when recycling liquid oil effluent comes about as follows: Recycle of liquid back from the bed outlet to the inlet improves distribution and contacting. Distribution is improved because the reacting liquid gets more chances to enter the catalyst bed. Contacting within the bed is improved because liquid holdup is higher and the component of pressure drop due to the liquid is increased. This is a more acceptable pressure drop than an equivalent amount obtained with a low aspect ratio bed of the same volume, because of the changes in flow patterns and pressure drops that take place as deposits are laid down within the bed.

Some of the further important advantages obtained by recycling a portion of the oil effluent include:

(1) The presence of recirculated oil tends to spread out the deposits of iron, alkaline earth compounds, salts, clays, and similar materials that tend to form in the interstitial spaces between the particles in the bed. This reduces pressure drop buildup and permits higher utilization of the contact particles before removal is required.

(2) The pressure drop across the high aspect ratio bed due to the presence of recirculated oil is a controllable variable; as deposits build up and increase the pressure drop, the need for recycle to improve contacting is somewhat reduced. Thus the recycle operates to serve the important function of allowing adjustments in liquid flow in response to the pressure drop across the bed. Thus a greater run length may be obtained for the bed of contact particles, and the bed's ultimate effectiveness is improved. Moreover, when using hydrogenation catalyst particles in the bed, which particles are particularly preferred in order to remove iron present in the feed as soluble organometallic compounds, the life and effectiveness of the catalyst is substantially prolonged.

(3) The buildup of deposits is most rapid in the regions of most effective distribution and conversion of the organometallic compounds. This increases the local pressure drop and forces redistribution of liquid to regions in which the deposits have not been as great. Thus maldistribution of liquid in the high aspect ratio bed is self-compensating to a large extent, particularly when the liquid flow through the bed is increased by the use of recycle effluent oil.

As indicated previously, radial flow beds and horizontal beds disposed, for example, in a cylindrical vessel, are particularly preferred beds generally having a high aspect ratio. However, as discussed above, the two-phase (vapor liquid) flow distribution of the feed to the high aspect ratio bed is a problem. To overcome this problem, it has been found that, in addition to the recycle of a portion of the effluent oil as discussed above, a substantial amount of hydrogen may be dissolved in the oil, thus making the feed to the bed substantially one phase; namely, liquid. If the feed to the bed is made essentially one phase by dissolving essentially all the hydrogen in the oil, the vapor-liquid distribution problem is virtually eliminated.

Thus in a preferred embodiment of the present invention at least a major part of the hydrogen gas feed to the bed is dissolved in the hydrocarbon feed in order to help minimize vapor liquid distribution problems across the bed. A particularly preferred embodiment of the present invention requires that essentially all of the hydrogen gas in the total feed to the high aspect ratio bed be dissolved in the oil.

As stated above, a preferred type of high aspect ratio bed is a radial flow bed. By "radial flow bed" is meant a generally cylindrical bed having a hollow core wherein the feed flows from the outside of the cylindrical bed radially inward to a collecting pipe located in the hollow core of the bed. Thus the radial flow bed is typically a cylindrical configuration of a mass of contact particles with a hollow core, the bed generally being disposed in a cylindrical vessel with sufficient space between the outside of the cylindrical bed of catalyst so that oil may enter the cylindrical vessel and flow inwardly through the bed to the hollow core for withdrawal.

In the present invention, it has been found that a large portion, generally between 40 and 90 percent, of the iron present in the hydrocarbon feed may be removed at relatively low hydrodemetalation temperatures, for example 650° F. and below. Particularly, the iron removal has been determined to be satisfactory when employing temperatures at or below 650° F. if at least one-third, and preferably at least one-half, of the liquid oil effluent is recycled as feed to the bed.

DETAILED DESCRIPTION OF THE DRAWINGS

Figure 1:
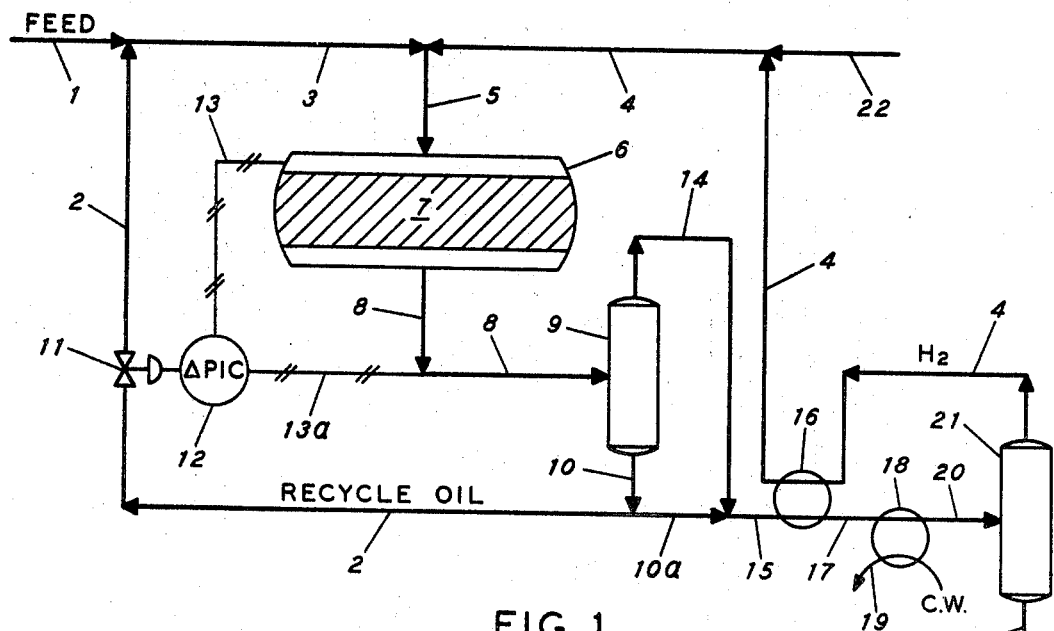
FIG. 1 is a simplified schematic flow diagram of a preferred embodiment of the present invention wherein the high aspect ratio bed is disposed in a horizontally positioned cylindrical vessel.

Referring now in more detail to the drawings, in FIG. 1 a hydrocarbon feed containing iron as a soluble organometallic compound or containing materials of the iron class enters via line 1. This hydrocarbon stream is combined with recycle oil from line 2. The combined stream is passed via line 3 and combined with recycle hydrogen via line 4. The recycle hydrogen is generally supplemented by added hydrogen introduced via line 22. Hydrogen addition generally will be between 50 and 2,500 standard cubic feed per barrel of fresh oil feed. The combined stream of fresh feed recycle oil and hydrogen is passed via line 5 to reactor vessel 6. Reactor vessel 6 may comprise a wide variety of vessel shapes wherein the longest dimension of the vessel is positioned approximately parallel to the horizon of the ground. In this particular preferred embodiment of the invention, a cylindrical vessel is contemplated.

The contact particles in reactor 6 are preferably supported on a screen or other support means above the bottom inside surface of the reactor vessel. Preferably a distributor means is located inside vessel 6 immediately above the top of the bed of contact particles. The distributor helps to uniformly distribute oil and/or vapor across the large cross-sectional area of bed 7.

The contact particles used in bed 7 are preferably porous, solid contact particles. Suitable materials for the contact particles include alumina, silica-alumina, carbon, and various mixed oxides comprising mixtures of cogels of one or more of silica, alumina, magnesia, titania, zirconia, boria, and similar inorganic refractory oxides. Alundum is also usable, but is much preferred that the contact particles have substantial surface area and porosity to increase their capacity for removing and retaining metal deposits. In addition to high temperature, it has been found that active hydrogenation catalysts are particularly useful as contact particles in the high aspect ratio bed, as it is preferable to react the organo-metallic compounds with hydrogen so as to free the iron from the soluble organometallic compounds. Suitable active hydrogenation catalysts include those comprising refractory inorganic oxide carriers, such as previously described promoted with sulfactive hydrogenation promoting metals and metal compounds such as the metals, oxides, and sulfides of Group VI and Group VIII metals. Nickel and molybdenum are particularly preferred metals from these groups.

The temperature maintained in reactor 6 is between 400 and 1,000° F., preferably between 550 and 900° F. As indicated previously, in a preferred embodiment of the present invention, the temperature is maintained below 650° F. The use of the lower temperatures—i.e., below 650° F.—results in metallurgical design advantages and it has been found that substantial iron removal can be obtained at temperatures of about 650° F. or lower. The pressure employed in reactor 6 is generally maintained between 200 and 5,000 p.s.i.g., preferably between 200 and 2,500 p.s.i.g.

The oil which has had iron and compounds of the class of iron removed in bed 7 is withdrawn from reactor 6 via line 8 and passed to flash drum 9. Vapor is withdrawn from flash drum 9 via line 14 and is combined with liquid oil withdrawn from flash drum 9 via line 10. The combined stream is passed via line 15 through heat exchanger 16 and is cooled by exchange with recycle hydrogen in line 4. The cooled reactor effluent is withdrawn from exchanger 16 in line 17 and is further cooled in exchanger 18 by exchange with cooling water passed through exchanger 18 via line 19. The reactor effluent at about 100 to 150° F. is withdrawn in line 20 and introduced to vapor liquid separator 21. Liquid oil product containing a substantially reduced amount of iron or other catalyst fouling materials, and more particularly bed plugging materials of the class of iron, is removed from separator 21 via line 23. This product may then be passed, for example, to a fixed bed hydrocracker.

Recycle hydrogen is withdrawn via line 4 from the top of separator 21 and, as previously indicated, is recycled to reactor 6 via lines 4 and 5 together with fresh hydrogen added via line 22.

A particularly important aspect of the present invention in a preferred embodiment is the recycle of oil withdrawn in line 10 from flash drum 9. Generally only a portion of the recycle oil is recycled via line 2; but, in some instances and particularly when the feed to the process is not an extremely heavy oil and when the contact particles in bed 7 are active hydrogenation catalyst particles, it is advantageous to recycle all the liquid withdrawn from flash drum 9 via line 10. In this instance, the entire product is withdrawn via line 14 from flash drum 9. Among other advantages obtained, all the product is oil which has been vaporized. Thus the oil is freed of all organometallic compounds except those which manage to pass through bed 7 and are vaporized at the conditions prevailing in flash drum 9 or are entrained in the vapor withdrawn via line 14 from flash drum 9. However, since the present invention is most advantageously applied to heavy oils, generally a substantial portion of the liquid withdrawn from the bottom of flash drum 9 via line 10 is passed to line 10a to be ultimately withdrawn as product in line 23.

The recycle oil in line 2, as previously indicated, serves many advantages in the process of the present invention, including improvement of the liquid flow distribution across bed 7 and improvement in the liquid holdup time in bed 7 so as to improve the efficiency of removal of iron and materials of the iron class. Also the recycle oil may be used to control the pressure drop across bed 7 in a preferred embodiment of the present invention. Thus the amount of recycle oil may be controlled via valve 11. Valve 11 in turn is controlled responsive to the pressure drop across bed 7. Thus, as shown in the drawing, valve 11 is controlled by pressure differential indicator 12 (PIC). PIC senses the pressure across the reactor bed via 13 and 13a.

Figure 2:
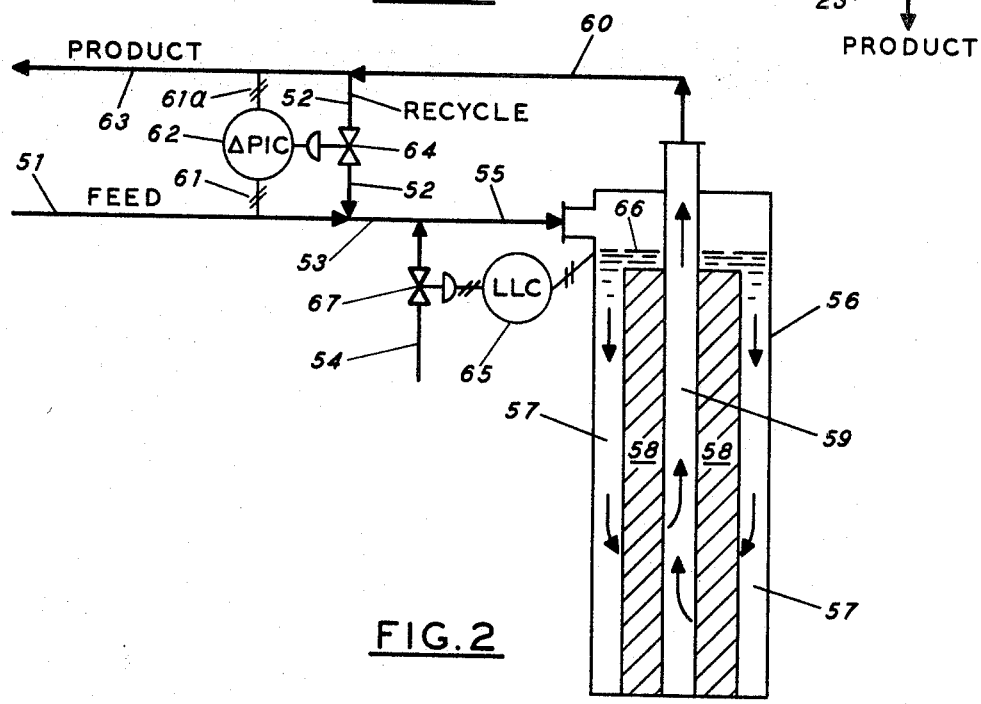
FIG. 2 is a simplified schematic flow diagram of a preferred embodiment of the present invention wherein the high aspect ratio bed is a radial flow bed of contact particles.

Referring now in more detail to FIG. 2, hydrocarbon feed containing soluble contaminants, such as organometallic iron compounds, is introduced via line 51. The hydrocarbon feed is combined with hydrogen introduced to the process via line 54, and the combined hydrogen and hydrocarbon feed are introduced to the radial flow reactor 56 via line 55. In order to obtain good distribution of the hydrogen together with the liquid oil through catalyst bed 58, it is preferable and, in substantially all cases, it is essential to this preferred embodiment of the present invention wherein a radial flow reactor is used that substantially all or at least a major part of the hydrogen be dissolved in the oil feed to reactor 56. Thus the flow to the reactor is essentially single phase flow (liquid) as the hydrogen is dissolved in the liquid oil. The flow to bed 58, which is a cylindrical annulus of contact particles, is indicated by arrows 57. The oil and dissolved hydrogen flow radially through catalyst bed 58 and then upward as indicated by arrows 59 in a collecting pipe through the hollow center of bed 58. The product is withdrawn from the reactor via line 60 and then is removed from the process via line 63. Modifications of the very simplified flow scheme shown in FIG. 2 may be made, for example, along the lines discussed with respect to FIG. 1. For example, use of a flash drum similar to flash drum 9 is generally advantageous.

It is advantageous to recycle a portion of the reactor effluent via line 52. Preferably more than one half of the feed to the reactor is recycled via line 52. As explained with respect to FIG. 1, the recycle is advantageously used to control the pressure drop across catalyst bed 58. As metals and other plugging material build up in bed 58 and increase the pressure drop, the recycle via line 52 may be decreased. Thus it is preferred to regulate the recycle by ΔPIC 62 which senses the pressure differential via line 61 and 61a.

Also, it is preferred to provide a control method which monitors the interface (liquid level 66) in reactor 56 and controls the hydrogen addition rate via valve 67 in line 54 to assure that there is free hydrogen over the liquid. One of the primary reasons for the liquid-vapor interface in reactor 56 is to help assure that liquid in reactor 56 is always saturated with hydrogen. Thus liquid level controller 65 is shown to schematically indicate the control of hydrogen to reactor 56 to maintain a hydrogen rich vapor phase above the liquid interface at liquid level 66.

Contact particles and/or catalyst as described with respect to FIG. 1 are used in bed 58.

EXAMPLES

As an example of the aspect ratio of particular bed configurations in a cylindrical vessel, a cylindrical vessel having a diameter of 6 feet and an $L/D$ ratio of 2.5, making the length of the vessel 15 feet, may be considered.

As a base case, if the flow is in the manner according to the prior art, that is through the cylindrical vessel parallel to the longitudinal axis running the 15-foot length of the vessel, then the aspect ratio is computed as follows for a bed 10 feet in length: The cross-sectional flow at the entrance to the bed is $\pi(3)^2=28.3$ feet$^2$ · The volume of the bed is 28.3 feet$^2 \times 10$ feet=283 feet.$^3$. Therefore, the aspect ratio is 28.3/283=0.10.

For a horizontal bed disposed in the same cylindrical vessel, but wherein the flow is perpendicular to the axis running the 15-foot length of the reactor, the aspect ratio is computed as follows: Allowing about 1⅓ feet both above and below the horizontal bed for feed distribution and bed support, respectively, the cross-sectional entrance flow area of the bed is about 75 feet$^2$. The total volume of the bed, utilizing the full length of the cylinder but not the volume of the heads on either end, is about 283 feet$^3$. Therefore, the aspect ratio for the horizontal bed is 75/283=0.265.

Using the radial flow bed, an even more marked improvement in aspect ratio is obtained compared to the aspect ratio of vertical cylindrical reactors used according to the prior art. For a 6-foot diameter cylindrical vessel with a radial flow catalyst bed of a 2-foot thickness having a 1-foot diameter center pipe and one-half-foot annular clearance between the outside periphery of the catalyst bed and the inside diameter of the cylindrical vessel, the cross-sectional outside area of the catalyst bed is $\pi \times 5 \times 15=235$ feet$^2$. Dividing this by the volume of the catalyst bed, 283 feet$^3$, gives an aspect ratio of 0.83.

To assess the ability of a radial flow type bed to remove iron from a hydrocarbon feed, a number of runs were made to simulate the radial flow bed. In all of these runs, the feedstock used was a heavy residuum from California crude oil. The gravity of the residuum was 5.2° API and less than 10% of it boiled below 1,000° F. To make the residuum handleable in the laboratory, it was cut with 35 volume percent xylene. The residuum contained over 100 parts per million each of nickel and vanadium and about 65 p.p.m. iron as soluble organometallic compounds.

To obtain essentially one phase (liquid) flow through the bed, only relatively small amounts of hydrogen were used. Also, the residuum and hydrogen were passed through a bed of non-porous Alundum particles in order to help dissolve the hydrogen in the residuum oil immediately prior to entering the main bed containing hydrogenation catalyst particles.

At a total pressure of 2,200 p.s.i.g., with 300 standard cubic feet of hydrogen dissolved in each barrel of oil, about 29 parts per million iron were removed in the bed of Alundum. The product from the Alundum bed was then passed through a bed of catalyst particles comprised of nickel and molybdenum compounds on a high porosity alumina-silica support. In this bed, about two-thirds of the iron present in the heavy oil effluent from the bed of Alundum was removed. Thus the product from the second bed contained about 12 parts per million iron. The temperature in both beds was maintained at about 650° F., and the liquid hourly space velocity was 2. This run was continued for approximately 220 hours, and the iron removal effectiveness remained approximately constant for each bed.

After the pressure was reduced to zero p.s.i.g. and the hydrogen reduced to zero cubic feet per barrel, the ion removal in the Alundum bed was very slight, resulting in an iron content in the Alundum bed effluent of about 56 parts per million. Also the iron removal in the hydrogenation catalyst bed was not very effective; the iron present in the effluent from the bed of hydrogenation catalyst particles was about 46 parts per million iron by weight. The same run was continued; and, after about 800 hours, the pressure was raised to 2,200 p.s.i.g., but the hydrogen rate was placed at only 100 standard cubic feet per barrel of oil. The iron removal in the Alundum bed was significantly better with the recommencing of hydrogen addition, resulting in the effluent from the Alundum bed having 38 parts per million iron. The percent improvement in iron removal across the bed of hydrogenation catalyst particles upon recommencing hydrogen addition was even greater. The iron present in the effluent from the bed of a hydrogenation catalyst was about 20 parts per million.

The same run was continued beyond 1,050 hours with the pressure maintained at 2,200 p.s.i.g. and the hydrogen rate at 100 standard cubic feet per barrel but with a small amount (2 percent by volume) of $H_2S$ added to the hydrogen. This resulted in the product from the bed of hydrogenation catalysts having only about 15 parts per million iron versus 20 parts per million when using only hydrogen, thus indicating a beneficial effect in the presence of $H_2S$ when removing iron at 650° F. using a hydrogenation catalyst.

The composition of the hydrogenation catalyst used in these runs was approximately 5.8 weight percent nickel, 17.8 percent molybdenum on an alumina-silica support of 78 percent alumina and 22 percent silica.

The foregoing examples are not to be construed as preferred embodiments of the process of the present invention. The preferred modes and best mode of the process of the present invention contemplated by the inventors is set forth in the Summary and Detailed Description sections of this application.

Although various specific embodiments of the invention have been described and shown, it is to be understood that they are meant to be illustrative only and not limiting. Certain features may be changed without departing from the spirit or essence of the invention. It is apparent that this invention has broad application to the removal of iron and other materials of the iron class contained in oils as soluble compounds. Accordingly, the invention is not to be construed as limited to the specific embodiments illustrated but only as defined in the following claims.

We claim:

1. In a process for removing iron contaminants contained in a hydrocarbon feedstock as soluble organometallic compounds wherein the hydrocarbon together with hydrogen gas is passed through a vessel containing only one separate bed of contact particles, said contact particles containing at least an inorganic refractory oxide, at an elevated temperature between 400 and 1,000° F. so that metals are deposited in the bed of contact particles, the improvement which comprises disposing said contact particles in a bed configuration which has an aspect ratio (the ratio of cross-sectional flow area at the entrance of the bed of contact particles to the volume occupied by the bed of contact particles) of at least 0.20.

2. A process according to claim 1 wherein the aspect ratio is at least 0.265.

3. A process according to claim 1 wherein the bed is a radial flow bed, which is cylindrical in shape with a hollow core and wherein the iron-contaminated hydrocarbon feedstock flows radially inward through the cylindrically shaped bed toward the hollow core of the bed.

4. The process according to claim 1 wherein the bed is disposed in a cylindrical vessel having a length of diameter ratio greater than 2.0, said cylindrical vessel being placed so as to have its longitudinal axis approximately parallel to the ground and wherein the hydrocarbon feed is passed through said bed in a direction generally perpendicular to said longitudinal axis.

5. A process according to claim 1 wherein at least a major part of the hydrogen gas fed to the bed is dissolved in the hydrocarbon feed.

6. A process according to claim 1 wherein a portion of the effluent from the bed is recycled as feed to the bed.

7. A process according to claim 1 wherein the bed is in the shape of an elongated cylindrical annulus having an outside surface area and wherein said bed is disposed in a vessel with entrance means to said vessel and space between said vessel and said outside peripheral surface area of said bed to allow the hydrocarbon to flow from said outside peripheral surface area through the bed to the hollow center of the elongated cylindrical annulus.

8. A process according to claim 4 wherein the feed to the bed is essentially one phase, namely liquid, with between 50 and 1,000 s.c.f. of hydrogen per barrel of hydrocarbon in the hydrocarbon feed to the bed and wherein at least fifty weight percent of the effluent from the bed is recycled to the bed.

9. A process in accordance with claim 1 wherein the contact particles contain a catalytic hydrogenation component selected from the group consisting of Group VI and Group VIII metals and metal compounds.

References Cited

UNITED STATES PATENTS

| | | | |
|---|---|---|---|
| 3,365,389 | 1/1968 | Spars et al. | 208—89 |
| 2,891,005 | 6/1959 | Heinrich | 208—253 |
| 3,291,721 | 12/1966 | Schuman | 208—97 |
| 2,943,040 | 6/1960 | Weisz | 208—91 |

DELBERT E. GANTZ, Primary Examiner

G. E. SCHMITKONS, Assistant Examiner

U.S. Cl. X.R.

208—89, 253